United States Patent
Brossard et al.

(10) Patent No.: US 11,676,567 B2
(45) Date of Patent: Jun. 13, 2023

(54) METHOD FOR MANUFACTURING A SOUND ABSORPTION STRUCTURE COMPRISING A CELLULAR PANEL INCORPORATING ACOUSTIC ELEMENTS AND SOUND ABSORPTION STRUCTURE OBTAINED USING SAID METHOD

(71) Applicant: Airbus Operations SAS, Toulouse (FR)

(72) Inventors: Denis Brossard, Saint Aignan de Grand Lieu (FR); Laurent Caliman, Toulouse (FR); Florian Ravise, Nantes (FR); Stéphane Le Clainche, Cheix en Retz (FR)

(73) Assignee: Airbus Operations SAS, Toulouse (FR)

( * ) Notice: Subject to any disclaimer, the term of this patent is extended or adjusted under 35 U.S.C. 154(b) by 621 days.

(21) Appl. No.: 16/722,264

(22) Filed: Dec. 20, 2019

(65) Prior Publication Data

US 2020/0202830 A1    Jun. 25, 2020

(30) Foreign Application Priority Data

Dec. 24, 2018    (FR) ...................................... 1874135

(51) Int. Cl.
*G10K 11/168*    (2006.01)
*F02K 1/82*    (2006.01)
(Continued)

(52) U.S. Cl.
CPC .......... *G10K 11/168* (2013.01); *B29D 24/008* (2013.01); *B29D 99/0021* (2013.01);
(Continued)

(58) Field of Classification Search
CPC . F02K 1/827; F02C 7/045; B32B 3/12; B32B 3/08; B29D 99/0021; B29D 24/008; G10K 11/16; G10K 11/168
See application file for complete search history.

(56) References Cited

U.S. PATENT DOCUMENTS 3,734,234 A * 5/1973 Wirt .................. F02K 1/827
428/116
2007/0151800 A1 * 7/2007 Olson .................. B32B 5/08
181/290

(Continued)

FOREIGN PATENT DOCUMENTS

KR    20140082226 A  *  7/2014
WO    2014200499 A1    12/2014

OTHER PUBLICATIONS

French Search Report; priority document.

*Primary Examiner* — Forrest M Phillips
(74) *Attorney, Agent, or Firm* — Greer, Burns & Crain, Ltd.

(57) ABSTRACT

A method for manufacturing a sound absorption structure comprising a cellular panel, a porous layer positioned on a cellular panel first face, a reflective layer positioned on a cellular panel second face and a plurality of acoustic elements positioned in the cellular panel. The method comprises the steps of producing, for each acoustic element, a recess in the cellular panel opening out onto the first and second faces of the cellular panel, inserting the acoustic elements into their recesses, laying an anchoring layer on the second cellular panel face, curing or polymerization at a first pressure to connect each acoustic element to the cellular panel and/or to the anchoring layer, putting in place the porous layer and the reflective layer, and curing or polymerization at a second pressure to connect the porous layer and the reflective layer to the cellular panel.

14 Claims, 4 Drawing Sheets

(51) Int. Cl.
*B32B 3/08* (2006.01)
*B29D 99/00* (2010.01)
*G10K 11/16* (2006.01)
*F02C 7/045* (2006.01)
*B29D 24/00* (2006.01)
*B32B 3/12* (2006.01)

(52) U.S. Cl.
CPC ............... *B32B 3/08* (2013.01); *B32B 3/12* (2013.01); *F02C 7/045* (2013.01); *F02K 1/827* (2013.01); *G10K 11/16* (2013.01)

(56) References Cited

U.S. PATENT DOCUMENTS

| | | | |
|---|---|---|---|
| 2012/0321835 A1* | 12/2012 | Hethcock, Jr. | B32B 37/146 156/247 |
| 2013/0186707 A1* | 7/2013 | Richter | F02K 1/827 181/292 |
| 2015/0041247 A1* | 2/2015 | Ichihashi | G10K 11/172 29/896.2 |
| 2018/0082669 A1* | 3/2018 | Lu | B32B 17/1055 |
| 2019/0071164 A1* | 3/2019 | Penn | B32B 38/0004 |
| 2020/0342843 A1* | 10/2020 | Brossard | B32B 38/1808 |

* cited by examiner

METHOD FOR MANUFACTURING A SOUND ABSORPTION STRUCTURE COMPRISING A CELLULAR PANEL INCORPORATING ACOUSTIC ELEMENTS AND SOUND ABSORPTION STRUCTURE OBTAINED USING SAID METHOD

CROSS-REFERENCES TO RELATED APPLICATIONS

This application claims the benefit of the French patent application No. 1874135 filed on Dec. 24, 2018, the entire disclosures of which are incorporated herein by way of reference.

FIELD OF THE INVENTION

The present application relates to a method for manufacturing a sound absorption structure comprising a cellular panel incorporating acoustic elements, together with a sound absorption structure obtained using the method.

BACKGROUND OF THE INVENTION

According to an embodiment of the prior art, a powerplant comprises a nacelle together with a dual-flow turbine engine positioned inside the nacelle. Some surfaces of the nacelle and the turbine engine comprise sound absorption structures to attenuate noise annoyance. According to one embodiment, a sound absorption structure comprises a porous layer, a honeycomb cellular layer and a reflective layer.

A UHBR (Ultra High Bypass Ratio) turbine engine has a fan rotating at lower frequencies than some turbine engines currently on the market, so that the sound absorption structures must be configured to attenuate low-frequency sound waves. To attenuate such sound waves, the honeycomb cellular layer must be very deep, which has a detrimental effect in terms of weight, space requirement and manufacturing.

Figure 1:
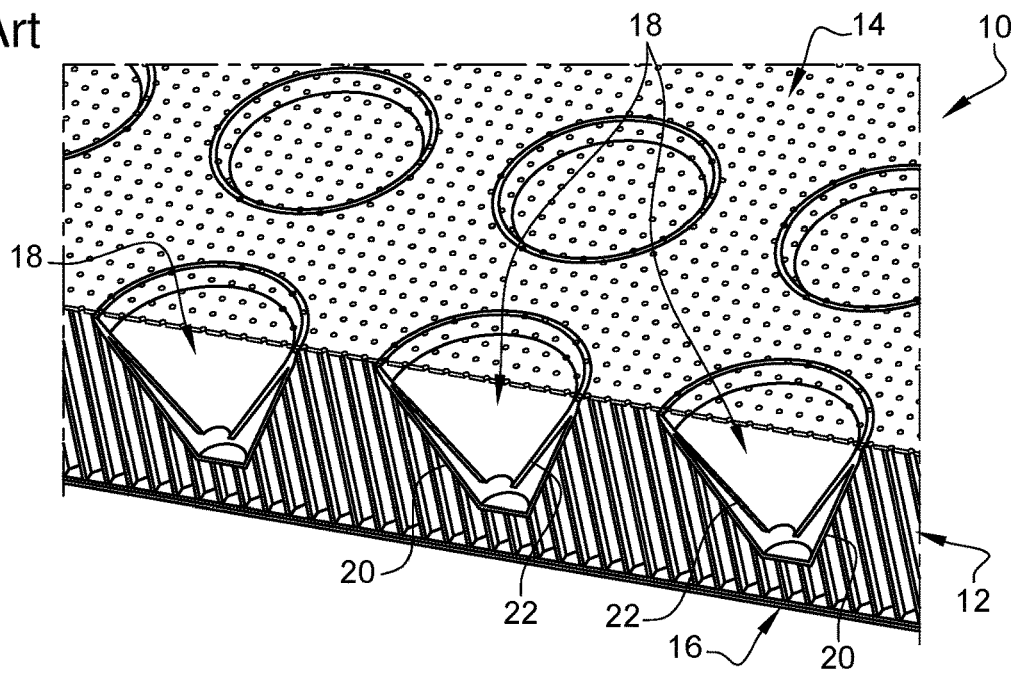

According to an embodiment visible in FIG. 1, a sound absorption structure 10 that makes it possible to absorb low-frequency sound waves comprises a honeycomb cellular panel 12, a porous layer 14 pressed against a first face of the cellular panel 12, a reflective layer 16 pressed against a second face of the cellular panel 12 and a plurality of acoustic elements 18 incorporated into the cellular panel 12. Each acoustic element 18 comprises a truncated conical first chamber 20 (also known as a capsule), having a large base closed by the porous layer 14 so that it defines a first cavity, together with a conical or truncated conical second chamber 22 (also known as a cone), positioned in the first cavity and separated from the first chamber 20. Each second chamber 22 comprises at least one acoustic orifice 24 making it possible to connect the inside of the second chamber 22 with the space between the first and second chambers 20, 22. The cellular panel 12 comprises, for each acoustic element 18, a blind truncated conical recess configured to house the acoustic element 18, away from the second face of the cellular panel 12 and opening out onto the first face of the cellular panel 12 only.

According to a known procedure, the method for manufacturing such a sound absorption structure comprises:
a first step of shaping the cellular panel 12, laying at least one anchoring layer against the second face of the cellular panel 12 and machining the recesses,
a second step of gluing the acoustic elements 18 and placing the acoustic elements 18 in their recesses (the first face of the cellular panel 12 being oriented upwards),
a third step of turning over the cellular panel 12 so as to press it against the porous layer 14 positioned on a fixture,
a fourth step of laying the reflective layer 16 against the anchoring layer, and
a final step of curing or polymerization, the first face of the cellular panel 12 being oriented downwards.

Figure 2:
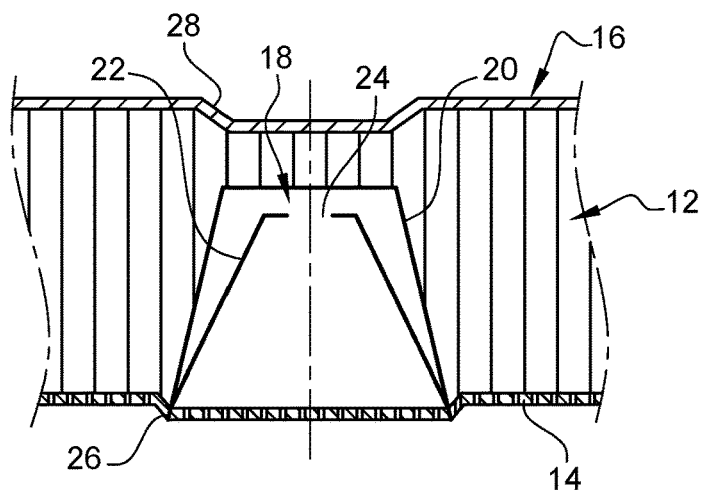

This procedure is not entirely satisfactory, as the acoustic elements 18 can come out of their recesses during the third step of turning over. During the curing or polymerization step, the acoustic elements 18, initially pressed into the bottom of their recesses, shift downwards until they come into contact against the porous layer 14. This downward shift of the acoustic elements 18 causes a mark 26 on the porous layer 14 and an indentation 28 on the reflective layer 16, as illustrated in FIG. 2.

SUMMARY OF THE INVENTION

The present invention aims to overcome all or some of the drawbacks of the prior art.

To this end, the invention relates to a method for manufacturing a sound absorption structure comprising a cellular panel, a porous layer positioned on a first face of the cellular panel, a reflective layer positioned on a second face of the cellular panel and a plurality of acoustic elements positioned in the cellular panel, each acoustic element comprising a first chamber that has a first mouth closed by the porous layer so that it forms a first cavity, a second chamber in which the first chamber is positioned, closed so that it forms a second cavity, and at least one acoustic orifice passing through the first chamber.

According to the invention, the manufacturing method comprises the steps of:
producing, for each acoustic element, a recess in the cellular panel that opens out onto the first and second faces of the cellular panel,
inserting the acoustic elements into their recesses,
laying an anchoring layer on the second face of the cellular panel,
curing or polymerization at a first pressure making it possible to connect each acoustic element to the cellular panel and/or to the anchoring layer,
putting in place the porous layer and the reflective layer, and
curing or polymerization at a second pressure making it possible to connect the porous layer and the reflective layer to the cellular panel.

Providing a first curing or polymerization step to connect the acoustic elements and the cellular panel and a second curing or polymerization step to connect the porous layer and the reflective layer to the cellular panel makes it possible to obtain excellent cohesion between the porous layer, the cellular panel and the reflective layer while limiting telegraphing phenomena during the first curing or polymerization step.

According to another feature, the first pressure is lower than the second pressure.

According to another feature, the first pressure is between 0.5 and 1 bar and/or the second pressure is on the order of 2 bar (+/−10%).

According to another feature, each acoustic element has a cylindrical side wall, and the first face of the cellular panel is pressed against a surface of a fixture during the step of inserting the acoustic elements up to the first curing or polymerization step, the acoustic elements being inserted into their recesses from the second face of the cellular panel.

According to another feature, for each acoustic element, a connecting system, which can be activated during the first curing or polymerization step, is positioned between the acoustic element and the cellular panel and/or the anchoring layer.

According to another feature, the connecting system comprises at least one intumescent adhesive film applied on at least one portion of a side face of each acoustic element prior to the insertion of the acoustic elements into their recesses.

According to another feature, the porous layer is polymerized in advance before being rigidly connected to the cellular panel and an adhesive film is inserted between the porous layer and the cellular panel before the second curing or polymerization step.

According to another feature, the adhesive film is configured so that it does not cover the acoustic elements.

The invention also relates to a sound absorption structure obtained using the manufacturing method according to one of the previous features, the sound absorption structure comprising a cellular panel, a porous layer positioned on a first face of the cellular panel, a reflective layer positioned on a second face of the cellular panel and a plurality of acoustic elements positioned in the cellular panel, each acoustic element comprising a first chamber that has a first mouth closed by the porous layer so that it forms a first cavity, a second chamber in which the first chamber is positioned, closed so that it forms a second cavity, and at least one acoustic orifice passing through the first chamber.

According to the invention, the cellular panel comprises, for each acoustic element, a recess that opens out onto the first and second faces of the cellular panel, and the sound absorption structure comprises an anchoring layer inserted between the second face of the cellular panel and the reflective layer.

According to another feature, the acoustic elements have a height that is substantially equal to the thickness of the cellular panel.

According to another feature, the sound absorption structure comprises an intumescent adhesive film inserted between the acoustic element and the cellular panel and/or the anchoring layer.

The invention also relates to an aircraft powerplant comprising at least one sound absorption structure according to one of the previous features.

SUMMARY OF THE INVENTION

Figure 3:
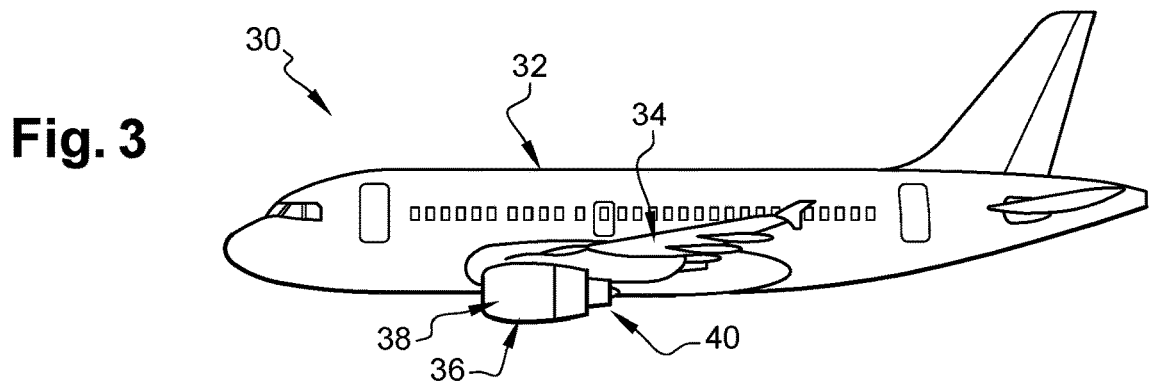
Figure 4:
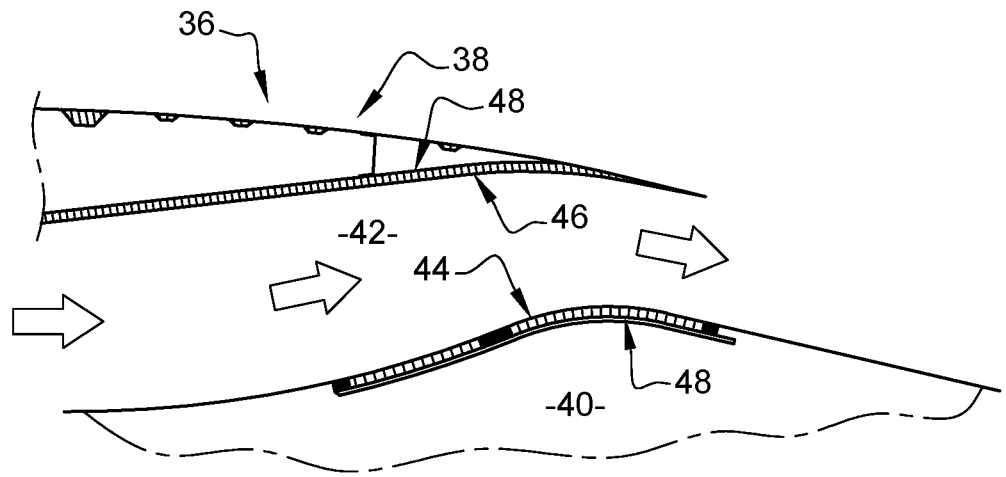
Figure 5:
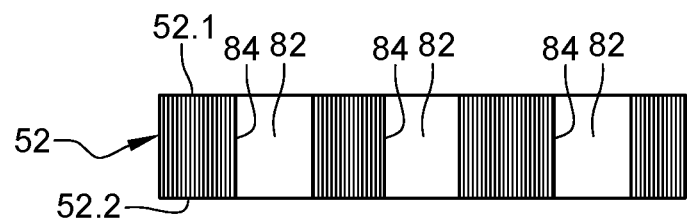
Figure 6:
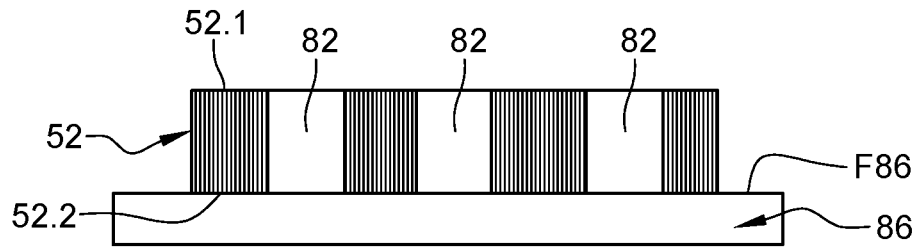
Figure 7:
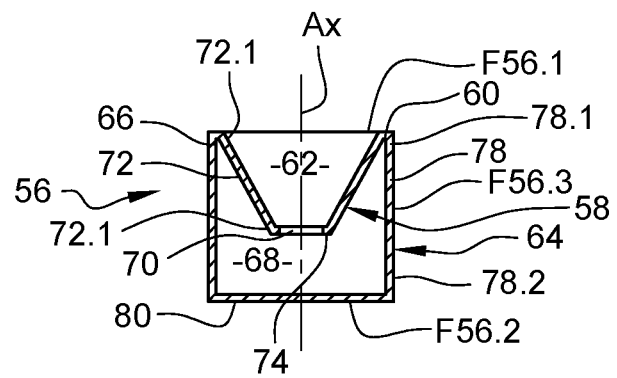
Figure 8:
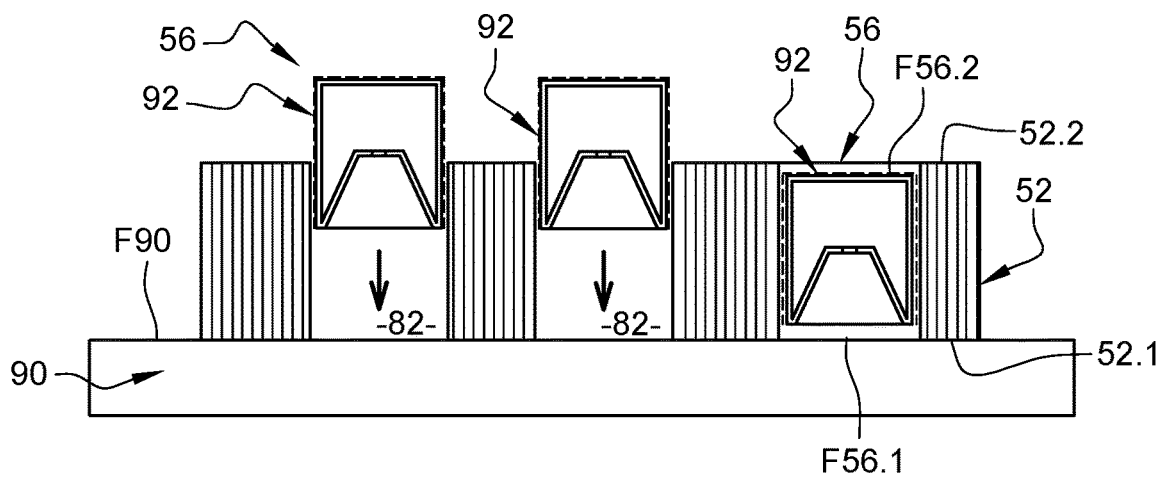
Figure 9:
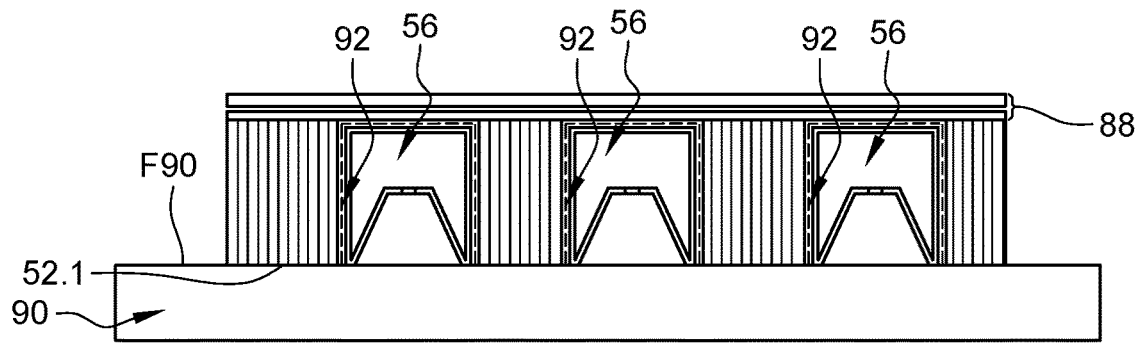
Figure 10:
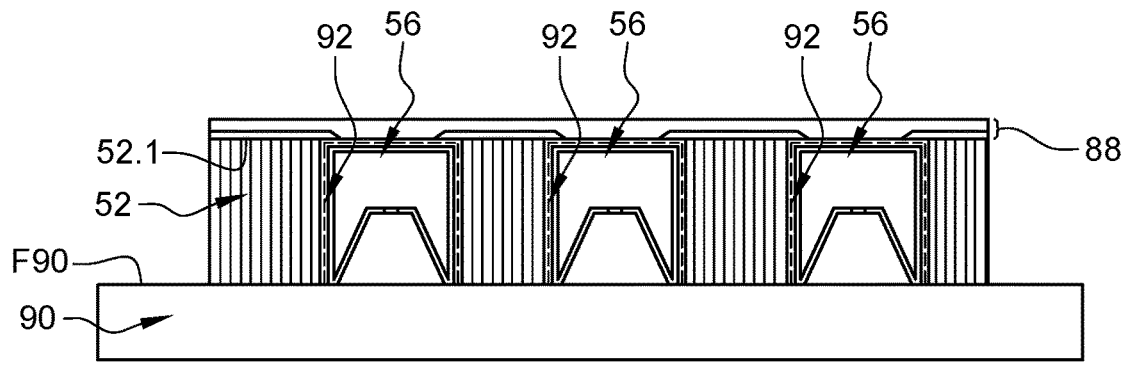
Figure 11:
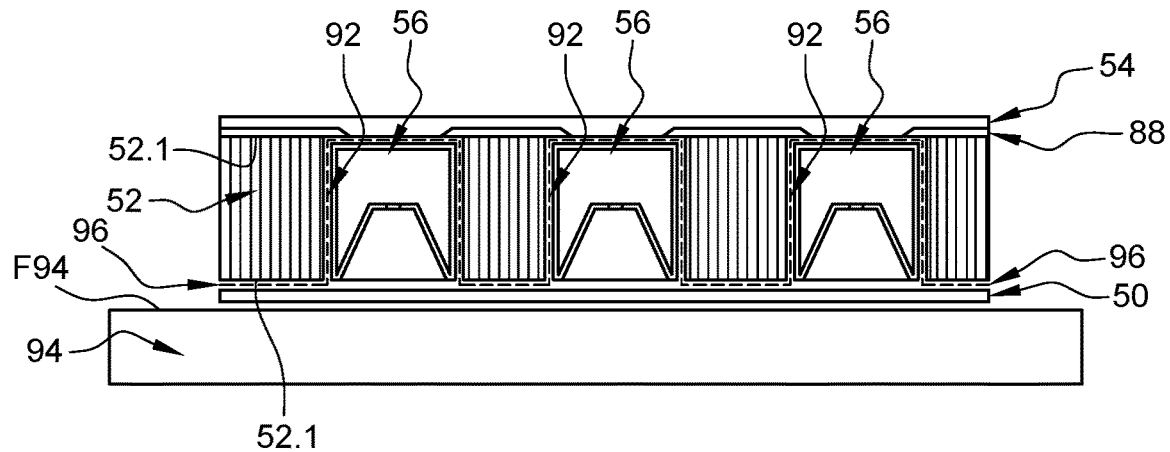
Figure 12:
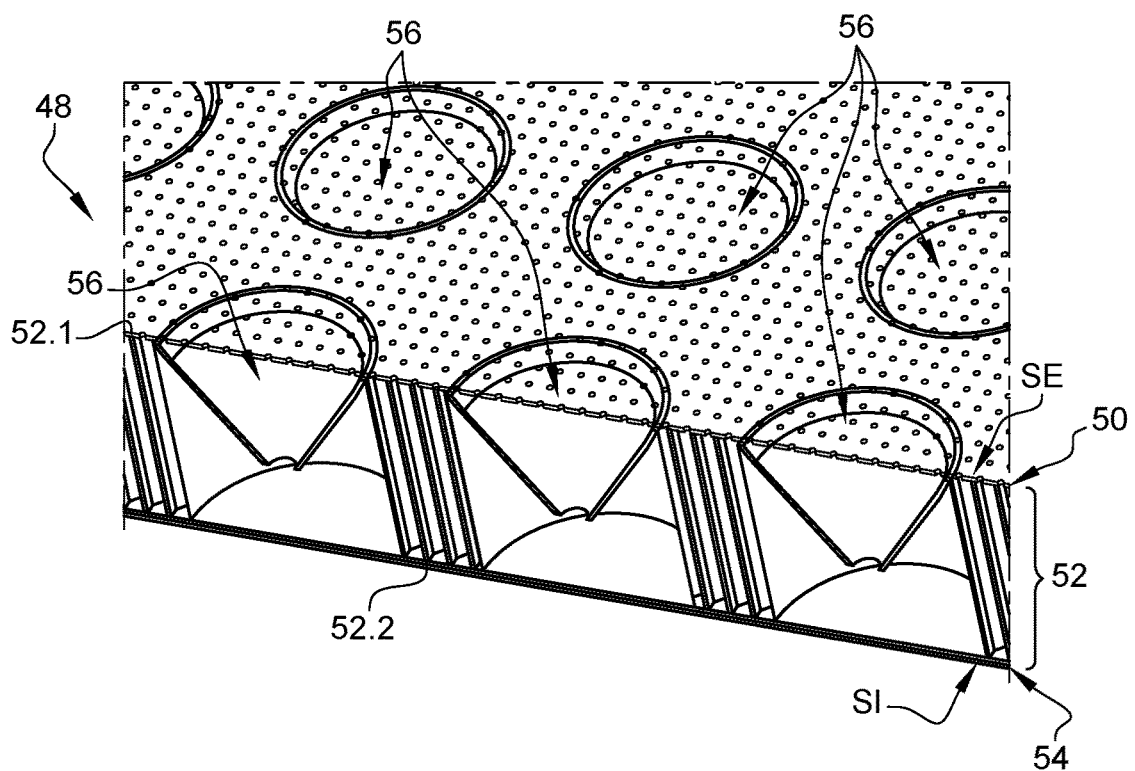

Further features and advantages will become apparent on reading the following description of the invention, given by way of example only, with reference to the attached drawings, in which:

FIG. 1 is a perspective view of a sound absorption structure that illustrates an embodiment of the prior art, FIG. 2 is a cross-section of a portion of the sound absorption structure visible in FIG. 1, FIG. 3 is a side view of an aircraft, FIG. 4 is a perspective view of a secondary discharge duct comprising a sound absorption structure that illustrates an application of the invention, FIG. 5 is a cross-section of a cellular panel that illustrates a first step of a method for manufacturing a sound absorption structure of one embodiment of the invention, FIG. 6 is a cross-section of a cellular panel that illustrates a second step of a method for manufacturing a sound absorption structure that illustrates one embodiment of the invention, FIG. 7 is a cross-section of an acoustic element that illustrates one embodiment of the invention, FIG. 8 is a cross-section of a cellular panel that illustrates a third step of a method for manufacturing a sound absorption structure of one embodiment of the invention, FIG. 9 is a cross-section of a cellular panel that illustrates a fourth step of a method for manufacturing a sound absorption structure of one embodiment of the invention, FIG. 10 is a cross-section of a cellular panel that illustrates a fifth step of a method for manufacturing a sound absorption structure of one embodiment of the invention, FIG. 11 is a cross-section of a cellular panel that illustrates a sixth step of a method for manufacturing a sound absorption structure of one embodiment of the invention, and FIG. 12 is a perspective view of a sound absorption structure that illustrates one embodiment of the invention.

DETAILED DESCRIPTION OF THE PREFERRED EMBODIMENTS

FIG. 3 shows an aircraft 30 that has a fuselage 32, two wings 34, arranged on either side of the fuselage 32, and powerplants 36 attached underneath the wings 34. Each powerplant 36 comprises a nacelle 38 and a turbine engine 40 positioned inside the nacelle 38.

According to an embodiment visible in FIG. 4, the powerplant 36 comprises a secondary discharge duct 42, channeling a secondary air flow, that is defined by an inner wall 44 (also known as an IFS or inner fixed structure) and by an outer wall 46 (also known as an OFS or outer fixed structure).

According to one configuration, the inner wall 44 or the outer wall 46 comprises a sound absorption structure 48 (also known as an acoustic panel).

Although it is described as applied to a secondary discharge duct 42, the invention is not limited to this application. The sound absorption structure 48 can thus be positioned on any skin that has an outer surface in contact with a medium in which sound waves propagate during operation, such as, for example, a lip and an air intake duct of an aircraft nacelle, a fan casing of an aircraft nacelle or any other surface of the powerplant 36. Regardless of the configuration, the powerplant 36 comprises at least one sound absorption structure 48.

According to an embodiment visible in FIG. 12, the sound absorption structure 48 has an outer surface OS in contact with a medium in which sound waves propagate during operation and an inner surface IS opposite the outer surface OS. The sound absorption structure 48 comprises, from the outer layer OS towards the inner layer IS, a porous layer 50 (also known as a resistive layer) one face of which forms the outer surface OS, at least one cellular panel 52, a reflective layer 54 one face of which forms the inner surface IS, and a plurality of acoustic elements 56 positioned in the cellular panel 52. The porous layer 50 is thus pressed against a first face 52.1 of the cellular panel 52 and the reflective layer 54 is pressed against a second face 52.2 of the cellular panel 52, opposite the first face 52.1.

According to one embodiment, the cellular panel 52 is a honeycomb structure.

Regardless of the embodiment, the sound absorption structure 48 comprises at least one acoustic element 56 positioned in the cellular panel 52.

According to an embodiment visible in FIG. 7, an acoustic element 56 comprises:
- a first chamber 58, also known as a cone, that has a first mouth 60 delimited by an edge pressed against the porous layer 50 so that the first chamber 58 and the porous layer 50 define a first cavity 62,
- a second chamber 64, also known as a capsule, in which the first chamber 58 is positioned, at least partially separated from first chamber, that has a second mouth 66 delimited by an edge pressed against the first chamber 58 (or optionally the porous layer 50) so that the second chamber 64 and the first chamber 58 (and optionally the porous layer 50) define a second cavity 68,
- at least one acoustic orifice 70 passing through the first chamber 58 to connect the first and second cavities 62, 68.

According to an arrangement visible in FIG. 12, the acoustic elements 56 are arranged in several rows and several columns. Other arrangements could be envisaged.

According to a first configuration visible in FIG. 7, the first chamber 58 is a truncated conical shape and comprises:
- a first side wall 72, delimited by a first edge 72.1 oriented towards the porous layer 50 and forming the first mouth 60, as well as by a second edge 72.2, opposite the first edge 72.1, and
- a first bottom wall 74 positioned on the second edge 72.2 of the first side wall 72 so that it closes the first cavity 62,
- the acoustic orifice(s) 70 being positioned on the first side wall 72 and/or on the first bottom wall 74.

The first chamber 58 can comprise a collar or a shoulder on the first edge 72.1 to rest against the porous layer 50.

According to an embodiment visible in FIG. 7, the second chamber 64 is a tubular or truncated conical shape and comprises a second side wall 78, delimited by a first edge 78.1 oriented towards the porous layer 50 and forming the second mouth 66, and by a second edge 78.2 opposite the first edge 78.1, as well as a second bottom wall 80 positioned on the second edge 78.2 of the second side wall 78 so that it closes the second cavity 68.

The second chamber 64 can comprise a collar or a shoulder on the first edge 78.1 to rest against the collar of the first chamber and/or against the porous layer 50.

According to a configuration visible in FIG. 7, the first chamber 58 is centered approximately in the second chamber 64 so that the first and second walls side 72, 78 are coaxial and have a single axis of rotation Ax.

Of course, the invention is not limited to the arrangements visible in FIG. 7 of the acoustic elements 56 and/or to these geometries and configurations of the first and second chambers 58 and 64. The conical, truncated conical or cylindrical first and second side walls 72, 78 could thus have non-circular cross-sections.

Regardless of the embodiment, each acoustic element 56 comprises a first end F56.1 (corresponding to the first mouth 60 of the first chamber 58) configured in order to be oriented towards the porous layer 50, a second end F56.2 (corresponding to the second bottom wall 80) configured in order to be oriented towards the reflective layer 54, and a side face F56.3 (corresponding to the outer surface of the second chamber 64) oriented towards the cellular panel 52. According to one configuration, each acoustic element 56 has a height (corresponding to the distance between the first and second ends F56.1, F56.2 of the acoustic element 56) that is approximately equal to the thickness of the cellular panel 52 (corresponding to the distance between the first and second faces 52.1, 52.2 of the cellular panel).

The acoustic elements 56 are produced by molding or any other procedure.

A method for manufacturing the sound absorption structure 48 comprises a first step of producing a recess 82 for each acoustic element 56 in a flat cellular panel 52. According to one particular feature of the invention, the recess 82 comprises a first end opening out onto the first face 52.1 of the cellular panel 52 and a second end opening out onto the second face 52.2 of the cellular panel 52. This recess 82 is delimited by a side boundary 84 that has an identical geometry to the side face F56.3 of the acoustic element 56.

According to one configuration, when the side face F56.3 of the acoustic element 56 is cylindrical, the side boundary 84 is cylindrical and has a diameter approximately equal to the diameter of the side face F56.3 of the acoustic element 56.

When the geometry of the sound absorption structure 48 is not flat, the method for manufacturing the sound absorption structure 48 comprises a second step of shaping the cellular panel 52 according to the desired geometry. To this end, the cellular panel 52 is formed against a first fixture 86 that comprises a forming surface F86 having an identical geometry to the desired geometry of the sound absorption structure 48, as illustrated in FIG. 6. For the sake of simplicity, the forming surface F86 has been shown flat. In reality, this forming surface F86 is generally curved.

The first and second steps could be reversed. However, performing the first production step before the second step of shaping the cellular panel 52 makes it possible to simplify the first step by performing the machining of the recesses in a flat cellular panel.

The method for manufacturing the sound absorption structure 48 comprises a third step of inserting the acoustic elements 56 into their recesses 82, illustrated by FIG. 8, and a fourth step of laying an anchoring layer 88 against the second face 52.2 of the cellular panel 52, illustrated by FIG. 9.

When the side face F56.3 of the acoustic element 56 is cylindrical, the first face 52.1 of the cellular panel 52 (the face against which the porous layer 50 will be pressed) is pressed against a laying surface F90 of a second fixture 90. This laying surface F90 is formed depending on the geometry of the cellular panel 52. Next, the acoustic elements 56 are inserted into their recesses 82 from the second face 52.2 of the cellular panel 52. When all of the acoustic elements 56 are positioned into their recesses 82, the anchoring layer 88 is laid on the second face 52.2 of the cellular panel 52.

When the side face F56.3 of the acoustic element 56 is not cylindrical but truncated conical for example, the acoustic elements 56 are placed in their recesses 82 from the first face 52.1 of the panel 52. When all of the acoustic elements 56 are positioned in their recesses 82, the first face 52.1 of the cellular panel 52 is pressed against the laying surface F92 of the second fixture 90, then the anchoring layer 88 is laid on the second face 52.2 of the cellular panel 52.

Providing cylindrical acoustic elements 56 makes it possible to insert them into their recesses 82 from the second face 52.2 of the cellular panel with no need to turn it over, the first face 52.1 already being pressed against the laying surface F90 of the second fixture 90.

After the third insertion step, when the acoustic elements 56 have a height that is substantially equal to the thickness of the cellular panel 52, the first and second ends F56.1, F56.2 of each acoustic element 56 are respectively flush with the first and second faces 52.1, 52.2 of the acoustic panel 52.

When an acoustic element 56 has a height that is smaller than the thickness of the cellular panel 52, the first end F56.1 of the acoustic element 56 is flush with the first face 52.1 of the cellular panel 52 and the second end F56.2 of the acoustic element 56 is offset relative to the second face 52.2 of the cellular panel 52. In this case, the space between the second end F56.2 of the acoustic element 56 and the second face 52.2 of the cellular panel 52 is filled by any appropriate means, such as, for example, an adhesive film.

According to one embodiment, the anchoring layer 88 comprises at least one fabric made from fibers, such as, for example, carbon fibers, impregnated with a resin, such as, for example, an epoxy resin. This anchoring layer 88 makes it possible to limit the occurrence of a telegraphing phenomenon on the surface of the sound absorption structure and/or the migration of resin towards the porous layer 50 during the production of the reflective layer 54.

For each acoustic element 56, a connecting system 92 is positioned between the acoustic element 56 and the cellular panel 52 and/or the anchoring layer 88.

According to one embodiment, the connecting system 92 comprises at least one adhesive film inserted between the acoustic element 56 and the cellular panel 52 and/or the anchoring layer 88. According to one configuration, at least one adhesive film is applied on at least one portion of the side face F56.3 of each acoustic element 56 prior to the insertion of the acoustic elements 56 into their recesses 82. According to one embodiment, the adhesive film of the connecting system 92 is an intumescent adhesive film.

According to one configuration, the connecting system 92 can be activated during a curing or polymerization step.

The method for manufacturing the sound absorption structure 48 comprises a fifth step of curing or polymerization to provide a connection between each acoustic element 56 and the cellular panel 52 and/or the anchoring layer 88, visible in FIG. 10. During this fifth step, the first face 52.1 of the cellular panel 52 is pressed against a surface, in particular the laying surface F90 of the second fixture 90, and the cellular panel 52 is covered with a curing or polymerization liner.

The fifth step of curing or polymerization is performed at a curing or polymerization temperature of the order of 180° C., and at a first pressure of between 0.5 and 1 bar.

During this fifth step, a slight indentation can appear on the anchoring layer 88, in line with each recess 82. However, this fault can be attenuated or corrected during the production of the reflective layer 54.

This fifth step makes it possible to obtain a connection between the anchoring layer 88 and the cellular panel 52 as well as between each acoustic element 56 and the cellular panel 52 and/or the anchoring layer 88.

According to one procedure, the polymerization can be partial and sufficient to immobilize the acoustic elements 56 relative to the cellular panel 52 and/or the anchoring layer 88.

The method for manufacturing the sound absorption structure 48 comprises a sixth step of putting in place the porous layer 50 and the reflective layer 54 and a seventh step of curing or polymerizing the sound absorption structure in order to obtain cohesion between the porous layer 50 and the cellular panel 52 and between the reflective layer 54 and the cellular panel 52.

During this sixth step, the porous layer 50 is laid on a laying surface F94 of a third fixture 94, then the cellular panel 52 provided with the acoustic elements 56 and the anchoring layer 88 is placed on the porous layer 50 and, finally, the reflective layer 54 is laid on the anchoring layer 88.

During the seventh step of curing or polymerization, the sound absorption structure is subjected to a curing or polymerization temperature of the order of 180° C., and to a second pressure on the order of 2 bar (+/−10%).

According to one procedure, when the anchoring layer 88 is fully polymerized, an adhesive film is inserted between the anchoring layer 88 and the reflective layer 54 during the sixth step.

According to one procedure, the porous layer 50 is polymerized in advance before being laid on the third fixture 94 in order to be rigidly connected to the cellular panel 52. An adhesive film 96 is inserted between the porous layer 50 and the cellular panel 52 during the sixth step before the seventh step of curing or polymerization. According to this procedure, the adhesive film 96 is configured so that it does not cover the acoustic elements 56 so that at the end of the curing or polymerization step, the acoustic elements 56 are not bonded to the porous layer 50 thus limiting the phenomena of marking of the porous layer 50.

According to one embodiment, the porous layer 50 is a perforated plate. If the perforation step is performed before the putting in place of the adhesive film inserted between the porous layer 50 and the cellular panel 52, this adhesive layer is laid on the cellular panel 52 only by cross-linking. If the perforation step is performed after the putting in place of the adhesive film, it can be put on the entire surface of the porous layer 50.

Regardless of the procedure, the method for manufacturing the sound absorption structure comprises a first step of curing or polymerization at a first pressure that makes it possible to connect each acoustic element 56 to the cellular panel 52 and/or to the anchoring layer 88 and a second step of curing or polymerization at a second pressure that makes it possible to connect the porous layer 50 and the reflective layer 54 to the cellular panel 52. According to one feature, the second pressure is higher than the first pressure so as to obtain excellent cohesion between the porous layer 50, the cellular panel 52 and the reflective layer 54 while limiting telegraphing phenomena during the first curing or polymerization step.

Connecting the acoustic elements 56 to the cellular panel 52 makes it possible to handle the cellular panel 52 without any risk of the acoustic elements 56 coming out of their recesses 82.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a sound absorption structure comprising a cellular panel, a porous layer positioned on a first face of the cellular panel, a reflective layer positioned on a second face of the cellular panel and a plurality of acoustic elements positioned in the cellular panel, each acoustic element comprising a first chamber that has a first mouth closed by the porous layer so that it forms a first cavity, a second chamber in which the first chamber is positioned, closed so that it forms a second cavity, and at least one acoustic orifice passing through the first chamber, the method comprising the steps of:

producing, for each acoustic element, a recess in the cellular panel that opens out onto the first and second faces of the cellular panel, inserting the acoustic elements into their recesses, laying an anchoring layer on the second face of the cellular panel, positioning a connecting system between an outer surface of the second chamber of each of the acoustic elements and at least one of the cellular panel and the anchoring layer, curing or polymerization at a first pressure allowing a connection of each acoustic element to at least one of the cellular panel or the anchoring layer, putting in place the porous layer and the reflective layer, and curing or polymerization at a second pressure allowing the porous layer and the reflective layer to connect to the cellular panel.

2. The method for manufacturing a sound absorption structure as claimed in claim 1, wherein the first pressure is lower than the second pressure.

3. The method for manufacturing a sound absorption structure as claimed in claim 2, wherein at least one of the first pressure is between 0.5 and 1 bar, or the second pressure is on the order of 2 bar.

4. The method for manufacturing a sound absorption structure as claimed in claim 3, wherein each acoustic element has a cylindrical side wall, and wherein the first face of the cellular panel is pressed against a surface of a fixture during the step of inserting the acoustic elements up to the first curing or polymerization step, the acoustic elements being inserted into their recesses from the second face of the cellular panel.

5. The method for manufacturing a sound absorption structure as claimed in claim 1, wherein, for each acoustic element, the connecting system is activated during the first curing or polymerization step.

6. The method for manufacturing a sound absorption structure as claimed in claim 5, wherein the connecting system comprises at least one intumescent adhesive film applied on at least one portion of a side face of each acoustic element prior to the insertion of the acoustic elements into their recesses.

7. The method for manufacturing a sound absorption structure as claimed in claim 1, wherein the porous layer is polymerized in advance before being rigidly connected to the cellular panel, and wherein an adhesive film is inserted between the porous layer and the cellular panel before the second curing or polymerization step.

8. The method for manufacturing a sound absorption structure as claimed in claim 7, wherein the adhesive film is configured so that the adhesive film does not cover the acoustic elements.

9. A sound absorption structure obtained using the manufacturing method as claimed in claim 1, said sound absorption structure comprising:

a cellular panel, a porous layer positioned on a first face of the cellular panel, a reflective layer positioned on a second face of the cellular panel and a plurality of acoustic elements positioned in the cellular panel, each acoustic element comprising a first chamber that has a first mouth closed by the porous layer so that the first chamber forms a first cavity, a second chamber in which the first chamber is positioned, closed so that the second chamber forms a second cavity, and at least one acoustic orifice passing through the first chamber, wherein the cellular panel comprises, for each acoustic element, a recess that opens out onto the first and second faces of the cellular panel, and wherein the sound absorption structure comprises an anchoring layer inserted between the second face of the cellular panel and the reflective layer.

10. The sound absorption structure as claimed in claim 9, wherein the acoustic elements have a height that is substantially equal to a thickness of the cellular panel.

11. The sound absorption structure as claimed in claim 9, further comprising an intumescent adhesive film inserted between the acoustic element and at least one of the cellular panel or the anchoring layer.

12. An aircraft powerplant comprising at least one sound absorption structure as claimed in claim 11.

13. The method for manufacturing a sound absorption structure as claimed in claim 1, wherein the acoustic elements have a height that is equal to a thickness of the cellular panel.

14. The method for manufacturing a sound absorption structure as claimed in claim 1, wherein each of the recesses are cylindrical.

* * * * *